UNITED STATES PATENT OFFICE.

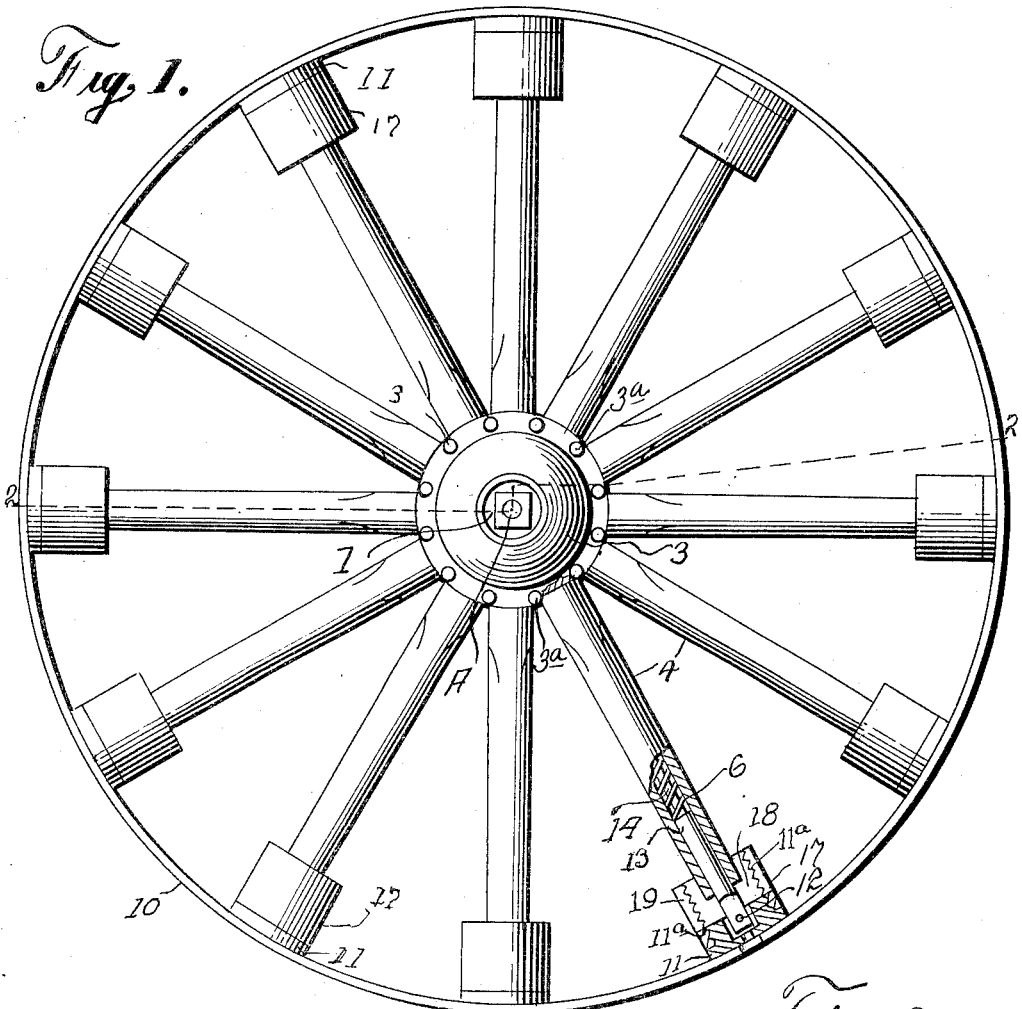

NEWTON WITHERS AND CLYDE SPEIDEL, OF RICHLAND CENTER, WISCONSIN.

SPRING-WHEEL.

1,086,497.     Specification of Letters Patent.     Patented Feb. 10, 1914.

Application filed August 7, 1912.    Serial No. 713,829.

*To all whom it may concern:*

Be it known that we, NEWTON WITHERS and CLYDE SPEIDEL, citizens of the United States, residing at Richland Center, in the county of Richland and State of Wisconsin, have invented certain new and useful Improvements in Spring-Wheels, of which the following is a specification.

Our invention relates to spring wheels and has for its object the provision of a wheel having a rigid rim, tubular spokes pivotally secured to the hub and plungers pivotally secured to the rim and operating in the tubular spokes, a spring being interposed between the plunger and each tubular spoke to give resilience to the wheel, the object being to dispense with the necessity for providing a cushioned tire of rubber, and thereby save the expense of wheels of this construction.

Our invention will be described in detail hereinafter and illustrated in the accompanying drawings, in which, Figure 1 is a side view partly in section of our improved spring wheel; and Fig. 2, a section on the plane indicated by the line 2—2 of Fig. 1.

In the drawings similar reference characters will be used to designate corresponding parts in both views.

Our improved wheel consists of a hub member comprising a tubular portion 1 adapted to be mounted on the spindle A, said tubular member 1 having an integral annular projection 2 and a sleeve 3 removably mounted thereon and secured in position by means of bolts 3ª engaging said annular projection 2 and said sleeve, said bolts being positioned as shown in Fig. 1 between the spokes to be hereinafter described. The spokes 4 are formed with annular bores having their portions adjacent to the hub as shown at 5 smaller in diameter than the remainder 6 of said bores forming a shoulder 7 intermediate of the ends of each spoke. The spokes are provided with trunnions 8 that engage sockets 9 in the opposing faces of the annular projection 2 and the sleeve 3, said trunnions permitting of a rocking movement of the spokes relatively to the hub.

The rim 10 is formed of a band of steel or other suitable rigid material and has secured thereon socket members 11 in which are pivotally mounted, by means of pins 12, plungers 13 that operate in the bores of the spokes 4, said plungers 13 having reduced portions 14 that slidably engage the reduced bores 5 of said spokes. 15 indicates a spring mounted on the reduced portion 14 of the plunger 13 and engaging the shoulders 7 in the tubular spoke 4 and the shoulder 16 on the plunger 13, said spring normally tending to move the plunger 13 outwardly of the tubular spoke. The socket member 11 is exteriorly threaded as shown at 11ª, and 17 indicates a threaded nipple mounted on the threaded portion 11ª and formed with an opening 18 to receive the outer end of the spoke 4. The inner ends of the socket members and nipples are slotted, as at 18 and 19 respectively, to permit a movement of the hub relative to the rim.

In operation, it will be apparent that as the wheel rotates, the spokes connecting the lowermost portion of the rim with the hub and the spokes adjacent thereto, will bear the weight of the vehicle and the springs within said spokes will be compressed so that the plungers move inwardly of the spokes until the reduced ends 14 thereof engage the tubular portion 1 of the hub, while the springs in the spokes on the upper side of the wheel move the plungers therein outwardly, the pivotal connection of the spokes with the hub and the plungers with the socket members in the rim, permitting the sliding movement of the plungers within the tubular spokes.

Having thus described our invention, what we claim is:—

A spring wheel comprising a tubular hub member having an integral annular extension, a sleeve removably mounted on said tubular hub member and oppositely disposed to said annular extension, bolts connecting said annular extensions of the sleeve, the opposing surfaces of said annular extension and sleeve being provided with sockets, spokes having trunnions thereon journaled in said sockets, each of said spokes having longitudinal bores therethrough, the bore adjacent to the hub being smaller in diameter than the portion adjacent to the outer terminal of the spoke, slotted socket members secured to the rim and having their outer portions threaded, plungers pivotally mounted in said sockets and engaging the outer portions of the bores of the spokes, said plungers being provided with reduced extensions engaging the smaller bores of the spokes, expansible coiled springs mounted on said reduced portions of the plungers and normally tending to move the plungers outwardly of the spokes, and threaded slotted nipples mounted on the threaded portions of the socket members, each of said nipples having an opening therein to receive the outer ends of one of the spokes, the walls of said openings being slotted to permit of rocking movement of the spoke relatively to the nipple.

In testimony whereof we affix our signatures in presence of two witnesses.

NEWTON WITHERS.
CLYDE SPEIDEL.

Witnesses:
F. W. BURNHAM,
MARY SPEIDEL.

Copies of this patent may be obtained for five cents each, by addressing the "Commissioner of Patents, Washington, D. C."